Oct. 20, 1964  V. S. MOSINSKIS  3,153,455

FOLDING MECHANISM

Filed Oct. 15, 1962  6 Sheets-Sheet 1

INVENTOR:
VICTOR S. MOSINSKIS,
BY Frank C. Leach Jr
Franklin J. Visek
ATTORNEYS.

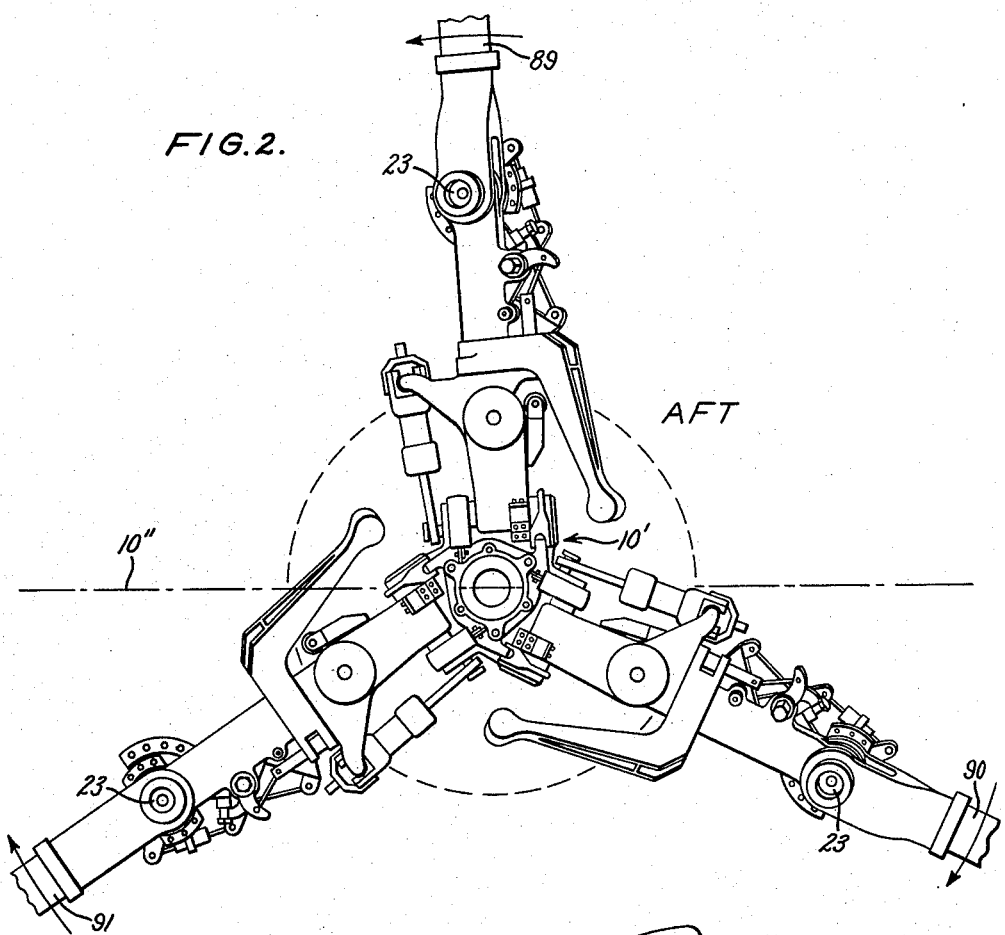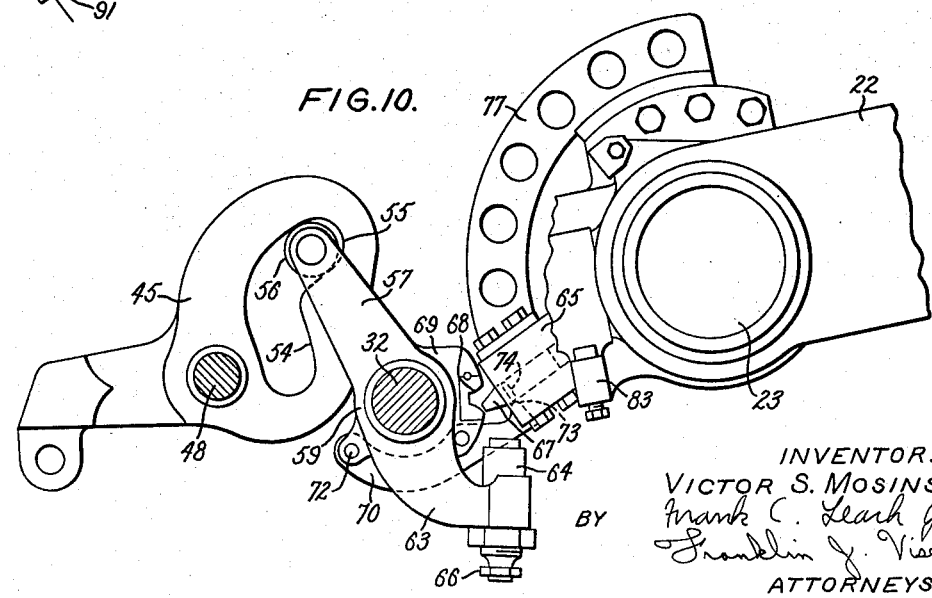

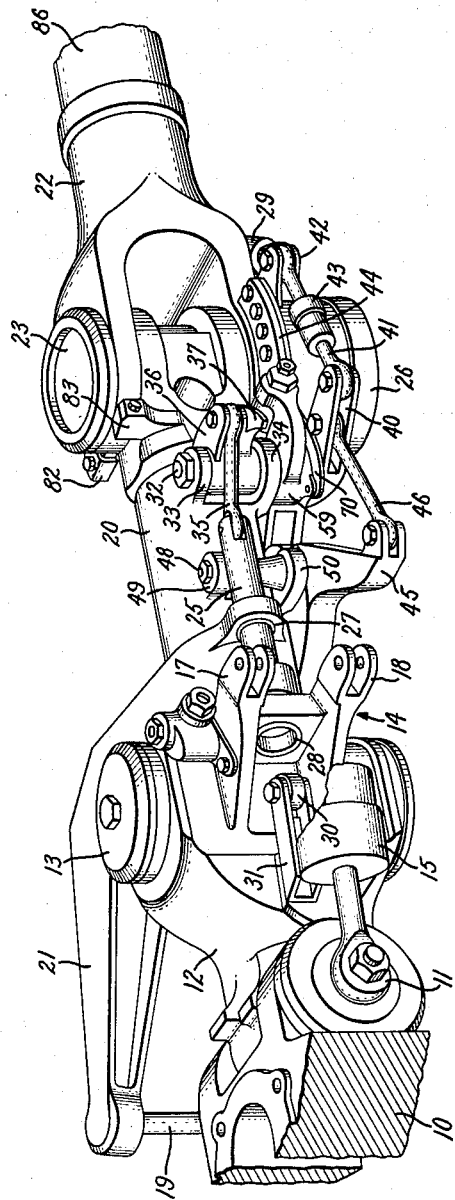

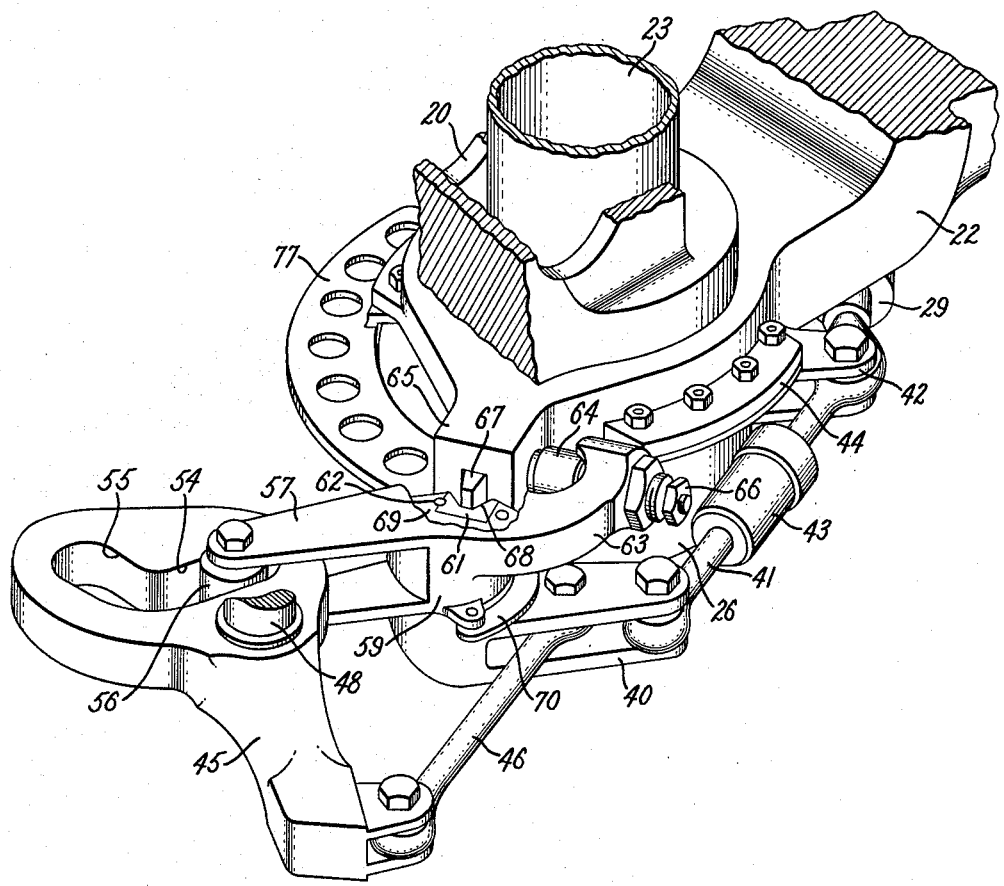

Oct. 20, 1964　　V. S. MOSINSKIS　　3,153,455
FOLDING MECHANISM

Filed Oct. 15, 1962　　6 Sheets-Sheet 5

INVENTOR:
VICTOR S. MOSINSKIS,
BY
ATTORNEYS.

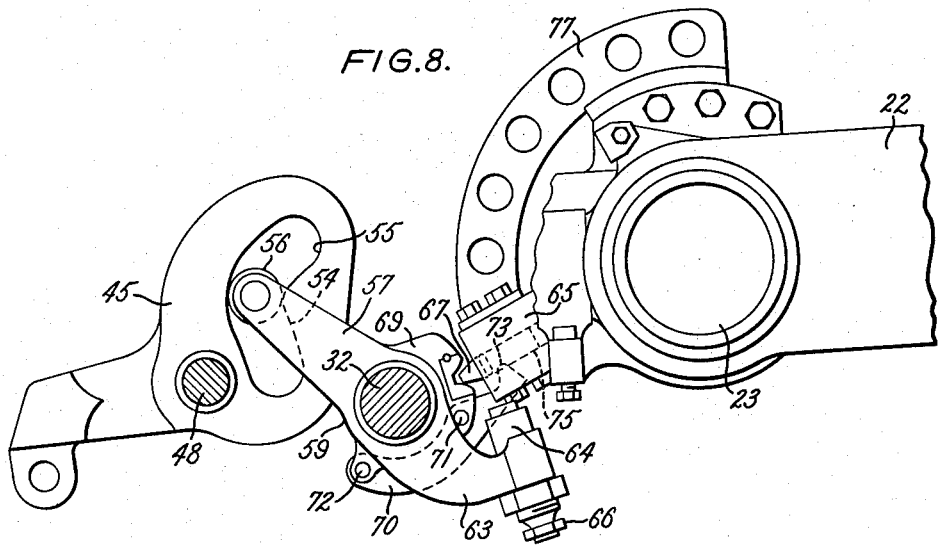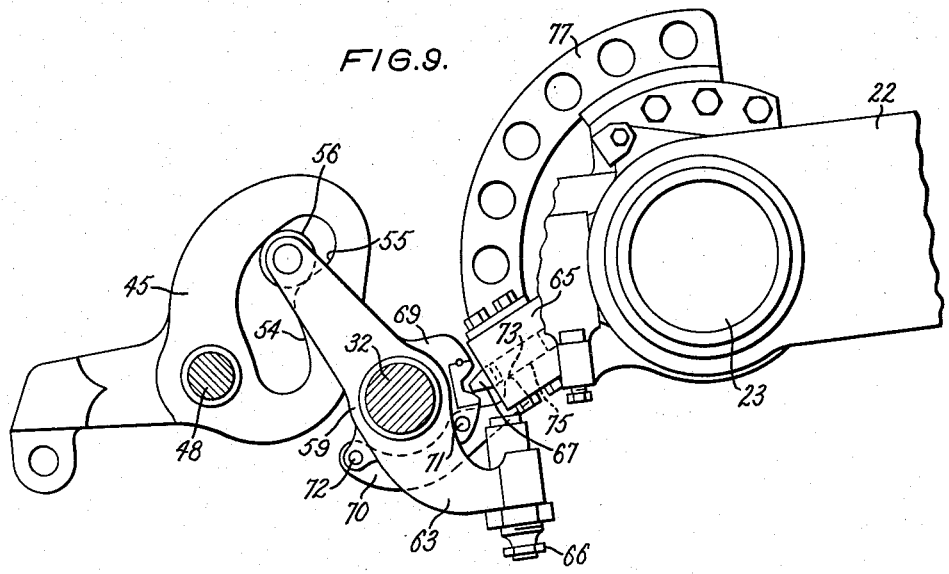

United States Patent Office 3,153,455
Patented Oct. 20, 1964

3,153,455
FOLDING MECHANISM
Victor S. Mosinskis, Springfield, Pa., assignor to The Boeing Company, Seattle, Wash., a corporation of Delaware
Filed Oct. 15, 1962, Ser. No. 230,460
12 Claims. (Cl. 170—160.12)

This invention relates to a folding mechanism and, more particularly, to mechanism for folding and unfolding rotor blades of a rotary wing aircraft.

It is often desirable, when parking rotary wing aircraft such as helicopters, to fold the rotor blades over the helicopter fuselage. In this manner, the amount of helicopter stowage and handling area, which is required during stowing and parking maneuvers, is greatly reduced. When helicopters are employed on surface ships, such as aircraft carriers, folding of the rotor blades enables transport of the helicopter to and from the hangar deck by elevators.

In the past, helicopter rotor blades have been folded both manually and by power blade folding mechanism. It has been necessary in the case of tandem rotor helicopters to dephase the rotors, insert pitch lock pins, and disengage blade dampers prior to manually folding the rotor blades. Dephasing is desirable for greater flexibility in the folding operation where several rotors are driven in intermeshing relationship. That is, where the forward rotor may be ideally positioned, the rear rotor may be completely out of position for compact folding. When it was desired to unfold the rotor blades, the reverse of this time consuming process was required. Environmental conditions, such as the combined velocities of head winds and aircraft carrier velocities, when a helicopter is disposed thereon, further complicate this manual procedure.

Power blade folding has previously been a cumbersome and complicated procedure. As in manual folding, the rotor blades are required to be preconditioned prior to folding. In prior power blade folding systems, separate actuators have been used to accomplish each condition of the preconditioning operation for each rotor blade. Further, power blade folding has required highly complicated blade folding mechanisms.

The present invention satisfactorily solves the aforesaid problems. The power blade folding system of the invention automatically folds and unfolds the rotor blades into desired positions by the use of a single actuator for each blade. Each actuator conditions its associated rotor blade for folding by locking the pitch thereof and setting the blade at a preselected lead or lag angle. Thereafter, the actuator folds the rotor blade into a preselected fold position. Of course, the preselected fold position is in a satisfactory spatial relationship with respect to the final fold positions of the other rotor blades and with the helicopter fuselage to avoid interference therebetween. Further, when the power blade folding system of this invention is employed on a helicopter having more than one rotor, the overlapping extremities of the rotor blades are maintained vertically separated when they are folded over the helicopter fuselage.

Rotor blade pitch control is achieved by rotation of the rotor blade about its longitudinal axis. Accordingly, as a rotor blade is folded about its fold point, the weight of the blade tends to cause the same rotational motion in the blade structure, which is not being folded, as is caused by blade pitch control movements. Therefore, if the blade pitch control is not locked, the outer extremity of the blade may strike the ground, helicopter fuselage, or other proximate objects. Thus, it is important to lock the pitch of the blade prior to folding to avoid damage to pitch linkage, the rotor blade, and objects in rotor blade proximity. Additionally, such rotational movement will tend to feed back into the pitch linkage and could cause damage thereto because of the large moment arm of the blade weight.

Conditioning a rotor blade by setting it at a desired lead or lag position before folding into fold position also has certain advantages. Some of the blades mounted about a rotor hub are folded in the direction of the "in flight" rotation of the rotor hub. However, the remainder of the blades mounted on the rotor hub are folded in a direction opposite to the normal rotor hub rotation. A maximum lead angle setting, when a rotor blade is to be folded in the direction of rotor hub "in flight" rotation, gives the advantage of requiring less distance to fold the blade. This same advantage is realized by setting the blade to a maximum lag angle when the blade is being folded in a direction opposite to the direction of the rotor hub "in flight" rotation. Of course, unless the lead or lag position is determined prior to folding into the fold position, the position of the rotor blade would be indeterminate. Accordingly, this would increase the hazards of blade interference or collision as the rotor blades are folded about the rotor hub means towards their fold positions.

Accordingly, an object of the present invention is the provision of a mechanism, which is uncomplicated and operates to automatically and swiftly fold and unfold elongated members.

Another object is to provide a mechanism for conditioning a helicopter rotor blade for folding and subsequently for folding the rotor blade into a fold position.

A further object of the invention is the provision of a folding mechanism for folding the rotor blades of a helicopter into predetermined fold positions over the fuselage after locking the blade pitch of the blades and setting them at a desired lead or lag position.

Still another object is to provide a helicopter blade folding and unfolding mechanism employing a single actuator for locking the pitch and controlling the lead or lag angle position of the blade prior to folding the blade into its fold position and then removing such pitch lock and lead or lag angle control when the blade is unfolded into flight position.

Other objects of this invention will be readily perceived from the following description, claims, and drawings.

This invention relates to a mechanism for folding and unfolding rotor blade means of a rotary wing aircraft. The mechanism comprises actuating means having a plurality of outputs and control means, which cause a first of the outputs to be operative and a second of the outputs to be inoperative during unfolded condition of the rotor blade means. Lock means, which is responsive to the actuating means, locks the rotor blade means to prevent change of pitch. The mechanism also has means to advance the rotor blade means to a folding position. The control means are actuated as the rotor blade means approaches folding position to cause the first torque output to become inoperative and the second torque output to become operative. In this manner, the actuating means moves the rotor blade means to its folded position.

This invention further relates to a mechanism for folding and unfolding first and second pivotal members. The mechanism employs power means, which has a first drive means adapted to rotate the first member into and out of a fold position and a second drive means adapted to actuate a first lock means and a second lock means. The first lock means is adapted to condition the first and second members prior to folding the first member into the fold position and to lock the second drive means from driving. The second lock means locks the first drive means from driving the first member when the first and second members are unfolded and locks the second drive means from driving when the first member and the second member are folding and unfolding. The second lock means is adapted to unlock the first member and the first drive means when the first lock means locks the second drive means. In this manner, the first drive means drives the first member into the fold position after the first lock means conditions the first and second members for folding.

The attached drawings illustrate a preferred embodiment of the invention, in which:

FIGURE 2 is a top plan view of a second rotor embodying the blade folding mechanism of the invention;

FIGURE 4 is a perspective view of a portion of blade mechanism, which employs the blade folding mechanism of the invention;

FIGURE 5 is a perspective view, partly in section, of a portion of the blade folding mechanism illustrated in FIGURE 4;

FIGURE 8 is a top plan view of the blade clamp assembly of FIGURE 6 at the point, during folding operations, at which the blade pitch has been locked, the lead or lag angle is being set, and the folding of the blade is beginning;

FIGURE 9 is a top plan view of the blade clamp assembly of FIGURE 6 at the mid-point of disengagement thereof; and FIGURE 10 is a top plan view of the blade clamp assembly of FIGURE 6 at the completion of disengagement thereof.

Figure 1:
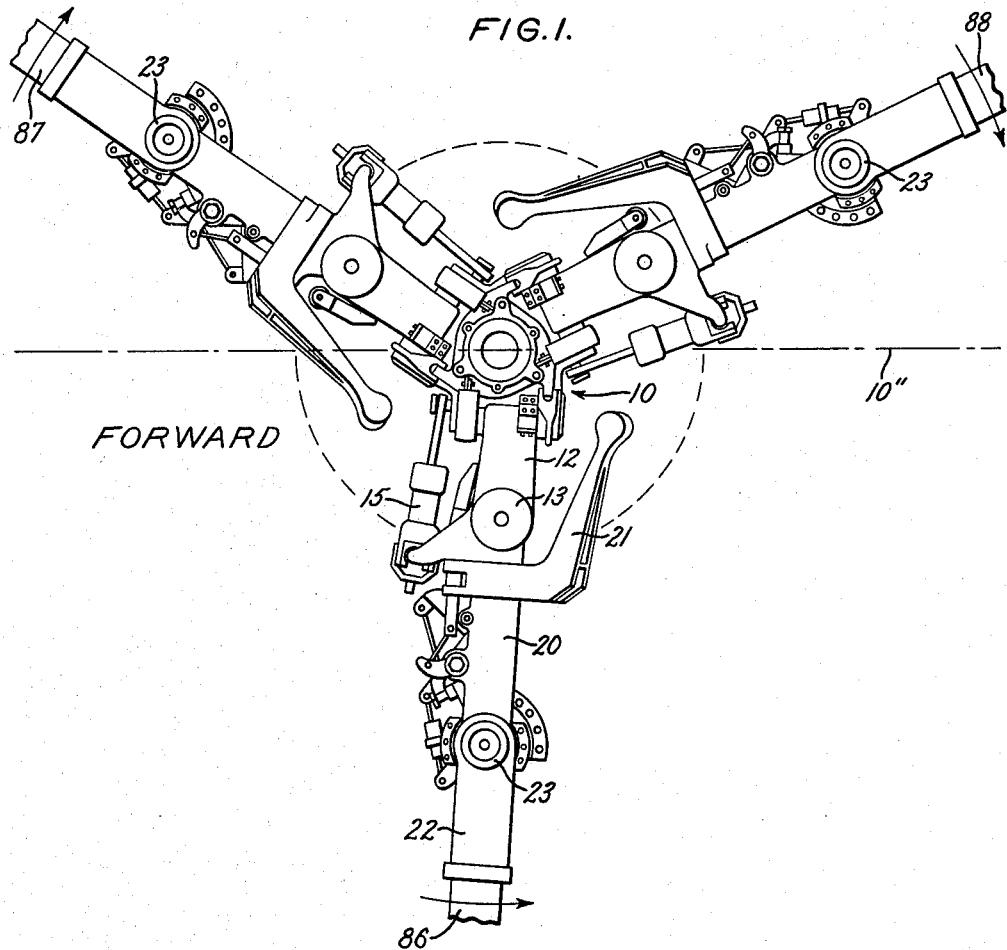
FIGURE 1 is a top plan view of a helicopter rotor which embodies the blade folding mechanism of the invention.
Figure 3:
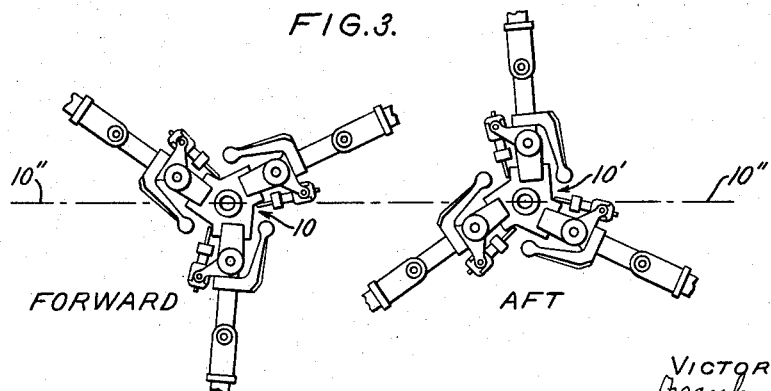
FIGURE 3 is a schematic top plan view of the arrangement of FIGURE 1, as a forward rotor, and of FIGURE 2, as a rear rotor, when employed on a helicopter having two lifting rotors.

Referring to the drawings and particularly FIGURES 1 and 2, there are shown rotor hubs 10 and 10'. In FIGURE 3, the rotor hubs 10 and 10' are shown arranged along a longitudinal center line 10" of a helicopter as, respectively, a forward rotor hub and a rear rotor hub. However, it should be understood that neither the number of rotor blades of a particular rotor nor the number or specific placement of rotors for a particular helicopter is of importance but may be varied as desired. In this manner, the invention disclosed herein may be utilized in helicopters having a single lifting rotor or a plurality of lifting rotors variably spaced with respect to each other.

As clearly shown in FIGURE 1, the rotor hub 10 drives rotor blades 86, 87, and 88. As seen in FIGURE 2, the aft rotor hub 10' drives rotor blades 89, 90, and 91.

As indicated by the directional arrows and as viewed from above the rotor hub 10 in FIGURE 1, the blades 87 and 88 are folded in a clockwise direction while the blade 86 is folded in a counterclockwise direction. In like manner, as viewed from above the rotor hub 10' in FIGURE 2, the rotor blades 90 and 91 are folded in a clockwise direction while the blade 89 is folded in a counterclockwise direction. Since some blades are folded in a clockwise direction while others are folded in a counterclockwise direction about the rotor hubs 10 and 10', mechanisms for opposite folding of the blades are required. Of course, balance weights may be employed to eliminate any static and dynamic unbalance, which results in the rotary system from the use of opposite mechanisms.

It is desirable to avoid the possibility of blade interference or collision during folding. Thus, fold pins 23, about which the rotor blades are folded, may be selectively inclined with respect to vertical planes, which extend along the longitudinal axes of the blades.

As illustrated in FIGURE 2, the fold pins 23 of the rotor blades 89 and 90 are inclined slightly with respect to such vertical planes. Accordingly, the blades 89 and 90 are capable of being folded into fold positions, which are vertically spaced with respect to the fold positions of other rotor blades. However, it should be understood that the blades, which employ inclined fold pins, may be varied as desired to achieve a variety of fold patterns.

The blade folding mechanism associated with each blade is exactly the same, both physically and operationally, except for obvious changes for opposite clockwise and counterclockwise folding mechanisms. Accordingly, only the blade folding mechanism of the blade 86 will be described in detail.

As shown in FIGURES 1 and 4, an extension link 12 is connected to the rotor hub 10 by a horizontal pin 11 to form a flap hinge. The flap hinge allows the blade 86 to flap at its outer extremities in a generally vertical plane. A lead-lag hinge is formed by the connection of a pitch shaft 14 to the extension link 12 through a substantially vertical pin 13. The lead-lag hinge allows the blade 86 to move transversely with respect to a longitudinal axis of the blade 86. However, lead-lag movements of the blade 86 are restricted by a damper 15, which is connected between the pin 11 and arms 17 and 18 of the pitch shaft 14.

A pitch bearing housing 20 is connected by the fold pin 23 to a blade socket 22 for controlling the pitch of the blade 86 in response to movement of a pitch arm 21. This movement of the pitch arm 21 occurs as a result of actuation of a pitch link 19 (see FIGURE 4) by internal helicopter controls, which are not shown. It should be understood that, while the blade socket is set forth herein as a separate component, it may be an integral part of the blade 86. Further, it should be understood that the pitch bearing housing 20 is a substantially hollow cylindrical member, which is mounted for rotation about its longitudinal axis on a portion (not shown) of the pitch shaft 14, which extends into the hollow cylindrical portion of the pitch bearing housing 20.

As is illustrated in FIGURE 4, the blade 86 is driven about the fold pin 23 to a preselected fold position by an actuator 26. The actuator 26 is a gear box having one attachment through a flange 44 to the blade socket 22 and a second attachment through an arm 42 and link 41 to an arm 40 of a countershaft 32. When torque is supplied to the actuator 26 by power means, such as a motor (not shown), the arm 42 and the flange 44 exert approximately equal and opposite torque.

Both the arm 42 and the flange 44 are designed to apply torque in planes substantially perpendicular to the pivotal axis of the fold pin 23. Thus, the arm 42 tends to rotate parallel but opposite in respect to the rotational force of the flange 44. In this manner, when the arm 42 or the flange 44 is held stationary, the other is a moving member. Accordingly, if the actuator flange 44 is held stationary, the actuator arm 42 becomes a movable member. Conversely, if the actuator arm 42 is held stationary, the flange 44 becomes the movable member.

When the arm 42 of the actuator 26 is driven clockwise, as viewed from above, clockwise rotation is imparted through the arm 40 to the countershaft 32. The countershaft 32 is rotatably mounted in bearings 33 and 34 of the pitch bearing housing 20 and has additional arms 36 and 37, which drive a pitch lock pin 25 by a link 35 connected therebetween.

When the blade 86 is in unfolded condition, the pitch lock pin 25 is held in bushings, such as bushing 27, in the pitch bearing housing 20. However, when the arm 42 rotates the countershaft 32 for folding the blade 86, the pitch lock pin 25 is advanced through a bushing 28 in the pitch shaft 14. Since the pitch shaft 14 is non-rotational about the longitudinal axis of the pitch bearing housing 20, the pitch housing 20 is locked to the pitch shaft 14 and locks the pitch of the blade 86.

The pitch lock pin 25 also is utilized to position the rotor blade 86 at a lead angle, which is the selective folding position from which it is desired to fold the blade 86. After the pitch lock pin 25 has been driven through the bushing 28, it abuts roller 30 of pin stop 31, which is mounted on the extension link 12. Since further advancement of the pitch lock pin 25 is prevented by the roller 30, additional force exerted by the arm 42 reacts through the countershaft 32 upon the pitch bearing housing 20. As this force acts on the pitch bearing housing 20, it causes the blade 86, the pitch bearing housing 20, and the pitch shaft 14 to pivot about the vertical pin 13 in a counter-clockwise direction. This causes the bushing 28 to advance on the pitch lock pin 25 and allows the countershaft 32 to rotate in response to the arm 42. As the pitch shaft 14 pivots about the vertical pin 13, the damper 15, which is connected between the horizontal pin 11 and the pitch shaft 14, is extended until arm 37 of the countershaft 32 abuts the housing 20. In this manner, the arm 37 locks the arm 42 from driving, and the damper 15 damps pivotal movements of the pitch shaft 14 about the vertical pin 13 after the blade 86 is set at the desired lead angle for folding.

It should be understood that, when a rotor blade is to be folded in a direction opposite to the direction of "in flight" rotation of the rotor hub, the blade will be set at a lag angle for folding therefrom. Accordingly, the blades 87 and 88, as seen in FIGURE 1, will be set at a lag angle for folding. In like manner, the blade 89, as seen in FIGURE 2, will be set at a lag angle while the blades 90 and 91 will be set at a lead angle for folding. Of course, when the rotor blades are rotated into a lag angle, their associated dampers are compressed.

As illustrtaed in FIGURE 4, a cam 45 is connected to the countershaft arm 40 by link 46. The cam 45 is mounted on a cam shaft 48, which is rotatably mounted in bearings 49 and 50 of the pitch bearing housing 20 for allowing rotational movements of the cam 45 in response to movement of the arm 42. As seen in the blade clamp assembly illustrated in FIGURE 5, the cam 45 has a first cam portion 54 and a second cam portion 55. The cam portions 54 and 55 provide cam action with a clamp roller 56 mounted on a clamp 59 by an arm 57. It should be understood that the blade clamp assembly and the arm 37, which abuts against the housing 20 to stop arm 42 from driving, control the amount and time the arm 42 and the flange 44 are allowed to drive.

The clamp 59 is rotatably mounted on the countershaft 32 for rotation with respect thereto. A second clamp arm 63, which is integral with the clamp 59, has a self aligning clamp shoe 64 at an extremity thereof for abutting and clamping against a projection 65 of the blade socket 22. The arm 63 includes adjusting means, such as screw 66, for adjusting the abutment of the clamp shoe 64 against the projection 65.

The blade clamp assembly (see FIGURES 6 and 7) includes a groove 75 in the blade socket projection 65. A gear tooth 67, which mates with a notch 68 in the clamp gear portion 69 of the clamp 59, is mounted in the groove 75. Fastening means, such as bolts 79, traverse the blade socket projection 65 and the groove 75; the bolts 79 also engage support 80 of a lock plate 77. In this manner, the blade socket projection 65, the gear tooth 67, and the lock plate 77 are fixedly joined into a unitary assembly. This assembly is clamped between the clamp arm 63 and a fixed stop 78, which is on the lower surface of the pitch bearing housing 20 (see FIGURE 7). That is, the clamp arm 63 abuts against the blade socket 65 and clamps it against the unfold stop 78.

The gear tooth 67 has a downwardly extending projection 74, which creates an effective continuance of a downwardly extending flange 76 of the lock plate 77. When the rotor blade 86 rotates during folding and unfolding movements, the unitary assembly of the blade socket projection 65, the gear tooth 67, and the lock plate 77 rotates therewith. Accordingly, the gear tooth projection 74 and the lock plate flange 76 also rotate with the blade 86 and contact a lock lever 70. The lock lever 70 is mounted on a lower surface of the clamp 59 by fastening means, such as rivets 71 and 72 (see FIGURE 6). As the gear tooth projection 74 and the lock plate flange 76 rotate, they slidably contact a slide surface 81 of the lock lever 70.

Figure 6:
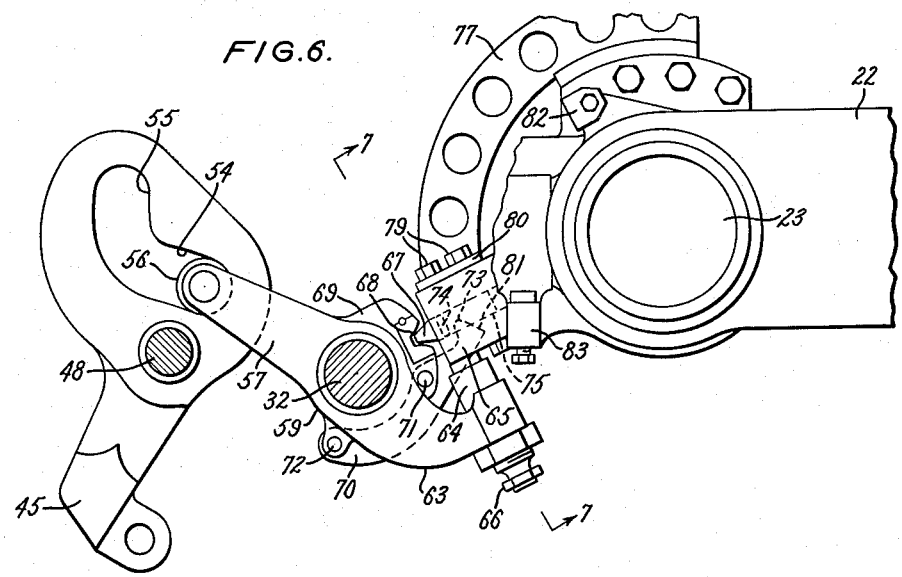
FIGURE 6 is a top plan view of an assembly for clamping the rotor blade prior to folding.
Figure 7:
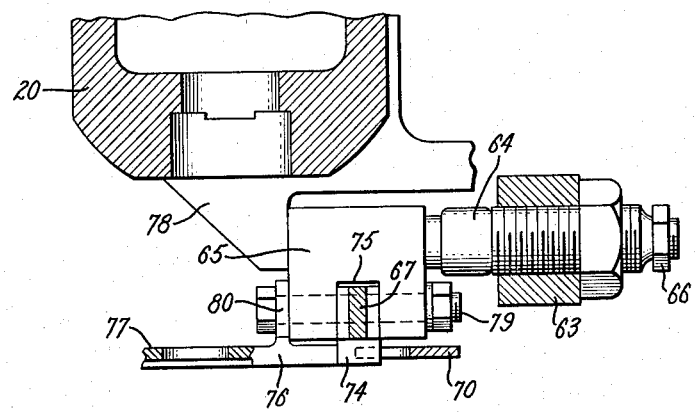
FIGURE 7 is an enlarged sectional view of the blade clamp assembly of FIGURE 6 taken along line 7—7 thereof.

Operation of the blade folding mechanism of the invention may be readily understood by reference to FIGURES 4 through 10. FIGURES 4 through 6 illustrate the position of the blade folding mechanism when the rotor blade 86 is in unfolded condition and prepared for flight. That is, the pitch lock pin 25 is withdrawn from the pitch shaft 14 for unlocking blade pitch controls and allowing movement of the rotor blade 86 into lead or lag positions. Additionally, the clamp arm 63 maintains the blade socket projection 65 clamped against the stop 78, and the gear tooth 67 is mated with the notch 68 of the clamp gear portion 69. Rotation of the clamp 59 is prevented by the cam portion 54, which bears against the roller 56 of the clamp 59.

When the blade is in flight condition and when the actuator 26 is energized for folding, the actuator arm 42 is the movable actuator member (see FIGURE 6). Since rotation of the clamp 59 is restricted by the cam portion 54, the clamp arm 63 and the clamp gear portion 69 hold the blade socket 22 from rotating and thereby hold the flange 44 from driving the blade socket.

Accordingly, when the blade 86 is in flight condition and the actuator 26 is energized, the arm 42 rotationally drives the countershaft arm 40. This rotation of the countershaft arm 40 imparts simultaneous rotation to the cam 45, the countershaft 32, and the pitch lock drive arm 36, which is splined to the countershaft 32.

As the actuator arm 42 rotationally drives the pitch lock drive arm 36, the pitch lock pin 25, which is connected to the arm 36, is axially driven through the bushings 27 and 28. When the pitch lock pin 25 has advanced through the bushing 28 of the pitch shaft 14, the pitch bearing housing 20 is locked from rotation with respect to the pitch shaft 14. This locks the pitch of the blade 86.

Continued advancement of the pitch lock pin 25 through the pitch shaft 14 by the pitch drive arm 36 causes the pitch lock pin 25 to abut the pin stop roller 30. Further force from the actuator arm 42 on the pitch lock pin 25 pivotally drives the pitch bearing housing 20 and the pitch shaft 14 about the substantially vertical pin 13. This pivotal rotation of the pitch shaft 14 causes the blade 86 to pivot with the pitch shaft 14 to the desired lead angle for blade folding. The damper 15 damps rotational movement of the pitch shaft 14, and the actuator arm 42 is stopped from further driving by the abutment of arm 37 against the pitch bearing housing.

Since the cam 45 is connected to the countershaft arm 40, rotation of the arm 40 by the actuator arm 42 also rotates the cam 45 and the cam shaft 48. As the cam 45 is rotated, the cam portion 54 rotates and repositions the clamp roller 56 with respect to the cam portion 54 without imparting rotational forces to the clamp 59.

The configuration of the cam portions 54 and 55 is chosen so that coaction of the roller 56 therewith is synchronized with the operation of the pitch lock pin 25. That is, when the roller 56 is substantially at the end of the cam portion 54 and the beginning of the cam portion 55, the pitch lock pin 25 has locked the pitch of the blade 86 and is driving it to the desired lead angle.

Thus, after the pitch lock pin 25 traverses the bushing 28 to lock the blade pitch, the actuator drive through the arm 42 phases out as the countershaft arm 37 restricts movement thereof. When the actuator drive through the arm 42 is phasing out, the actuator drive through the flange 44 phases in as the clamp roller 56 rounds the cam "knee," which is the joinder of the cam portions 54 and 55. FIGURE 8 illustrates the relative positions of the blade clamp assembly and the components thereof at this point of the blade folding operation.

Of course, after the roller 56 has rounded the cam "knee," the actuator drive through the arm 42 is completely phased out and the roller 56 is free to traverse the cam portion 55. At this point, the actuator drive through the flange 44 is completely phased in and is the moving member of the actuator 26.

Summarizing the blade folding operation to this point, it can be clearly seen by reference to FIGURE 5 that the arm 42 is allowed to rotate until restrained therefrom by the countershaft arm 37. At the same time, the flange 44 and the blade socket 22 are held from rotation by the clamp 59 until the cam 45 is rotated sufficiently by the arm 42 to allow the clamp 59 to rotate and drive the cam roller 56. That is, the clamp arm 63, which clamps the blade socket projection 65 against the stop 78, and the notch 68 of the clamp gear portion 69, which engages the gear tooth 67, are locked from clockwise rotation by the position of the roller 56 with respect to the cam portion 54. However, as the roller 56 phases out from the cam portion 54 and into the cam portion 55, the clamp 59 is released and allows the flange 44 to rotate. Since the actuator arm 42 is held from rotation by the countershaft arm 37, the actuator flange 44 is free to rotate counterclockwise and is the moving member of the actuator 26.

Further rotation of the actuator flange 44 and the blade socket 22, which is connected thereto, causes the blade 86 to fold about the fold pin 23. The gear tooth 67 in the blade socket projection 65 drives the notch 68 and the clamp gear portion 69 to rotate the clamp 59 clockwise about the countershaft 32 as the blade 86 folds. Rotation of the clamp 59 drives the roller 56 along the cam portion 55. Such movement can best be seen by reference to FIGURE 9 wherein the disengagement of the blade clamp assembly is approximately at its mid-point. It should be noted that, as the clamp 59 rotates, the clamp arm 63 and the lock lever 70, which is connected to the clamp 59, also rotate so as to allow substantially unencumbered counterclockwise rotation of the blade socket 22 and the projection 65 thereof.

The gear tooth 67 rotates the clamp 59 until the gear tooth 67 leaves the notch 68 of the clamp gear portion 69. This completes disengagement of the clamp 59 from the gear tooth 67 as illustrated in FIGURE 10. However, as clearly shown in FIGURE 10, the clamp arm roller 56 does not quite reach the end of the cam portion 55 when disengagement of the gear tooth 67 from the clamp 59 is complete.

After the gear tooth 67 leaves the notch 68, the gear tooth projection 74 contacts a lateral projection 73 of the lock lever 70, which is attached to the clamp 59. As the lateral projection 73 is nudged by the gear tooth projection 74, the clamp 59 is rotated a small additional amount. This slight additional rotation drives the clamp arm roller 56 to the end of the cam portion 55 and causes the notch 68 to rotate so as to assume a more open position. This facilitates re-engagement of the gear tooth 67 when the blade 86 is unfolded.

The slight rotation imparted to the clamp 59 by the contact of the lateral projection 73 with the gear tooth projection 74 positions the slide surface 81 of the lock lever 70. In this manner, the slide surface 81 is positioned to slidably contact the peripheral edges of the projection 74 and the lock plate flange 76 as the blade socket 22 is rotated. This sliding contact locks the clamp 59 from rotation and assures that the notch 68 will remain in its open position to re-admit the gear tooth 67 therein. Since it is only the contact of the lock lever projection 73, which is particularly wear inducing, the lock plate 77 and the flange 76 may be constructed of a light and economical material such as, for example, aluminum.

After the contact of the lateral lock lever projection 73 with the gear tooth projection 74, the blade 86 is free to complete its rotation to fold position. The fold position and the extent of pivotal rotation of the blade socket 22 is determined by the stops 82 and 83 which are mounted on the blade socket 22 and the pitch bearing housing 20, respectively (see FIGURE 4).

When it is desired to accomplish an unfold cycle, the actuator 26 is again energized. Of course, during an unfold cycle, the actuator drive members (the arm 42 and the flange 44) again exert substantially equal and opposite torque. However, each exert torque in a direction opposite to the direction in which they exerted torque during the fold cycle. When the blade 86 is in folded condition, the actuator arm 42 is held from driving because the roller 56 bears against the cam portion 55 and prevents the cam 45 from rotating. Thus, the actuator flange 44 is the movable actuator member and rotates the blade socket 22 about the fold pin 23 to return the blade 86 to flight position.

As the blade socket 22 rotates to unfold the blade 86 into flight position, the lock plate flange 76 and the gear tooth projection 74 rotate with the blade socket 22 to disengage the slide surface 81 of the lock lever 70. The rotation of the blade socket projection 65 drives the gear tooth 67 into the notch 68 of the clamp gear portion 69. As the blade socket 22 continues to rotate, the gear tooth 67 rotationally drives the clamp 59 to return the clamp arm roller 56 to the cam "knee" joining the cam portions 54 and 55. In this manner, the cam 45 unlocks and becomes available for rotation with the cam shaft 48. Thus, the actuator drive through the flange 44 begins to phase out and the actuator drive through the arm 42 begins to phase in.

Actuator drive through the flange 44 is completely phased out when the blade 86 has completed its unfold movements. That is, when the blade 86 has completed its unfold movements, the blade socket projection 65 abuts the stop 78 on the pitch bearing housing 20. Further, at this point in the unfold cycle, the gear tooth 67 has mated with the notch 68 and has rotated the clamp 59 so that the clamp arm 63 clamps the blade socket projection 65 against the stop 78. This rotation of the clamp 59 by the gear tooth 67 also drives the roller 56 from the cam portion 55 to the cam portion 54.

The final stages of the unfold cycle are completed by the arm 42 of the actuator 26. That is, the arm 42 simultaneously rotates the countershaft 32 and the cam 45 on the cam shaft 48 counterclockwise. However, during unfolding, the arm 42 drives the countershaft 32 and the cam 45 in a direction opposite to the direction in which they are driven during the fold cycle. Accordingly, rotation of the countershaft 32 withdraws the pitch lock pin 25 from the pitch shaft 14 to disengage the lock of the blade pitch and the setting of the lead angle. In like manner, counterclockwise rotation of the cam 45 causes the cam portion 54 to rotate and position the clamp roller 56 at an extremity thereof, which is remote from the cam portion 55.

This position of the clamp roller 56, with respect to the cam portion 54, limits the arm 42 from further driving during the unfold cycle. Additionally, the roller 56 restricts rotational movement of the clamp 59 and assures that the clamp arm 63 and the clamp gear portion 69 firmly hold the blade socket projection 65 in unfold condition.

It should be understood that, during the unfold cycle, a heavy spring 29 (see FIGURES 4 and 5) brakes and limits overtravel of the actuator arm 42, which is caused by the inertia of the armature of the actuator motor (not shown). The heavy spring 29 is mounted on the blade socket 22 in such a manner as to block the movement of the actuator arm 42 during unfold overtravel thereof. A spring 43 is arranged in the link 41. The spring 43 allows the link 41 to extend a small amount and to maintain full clamping force on the cam 45 in the event that the actuator arm 42 backs off slightly due to flight forces.

Further, it should be understood that the notch 68 of the clamp gear portion 69 may be formed in a notched member 61 (see FIGURE 5). In this case, the notched member 61 would be locked into the clamp gear portion 69 by a lock pin 62. Accordingly, the notched member 61, which is subjected to high wear, may be formed of hardened material, such as stainless steel, and remainder of the clamp 59 may be formed of a softer material.

It can be clearly understood from the foregoing that this invention offers numerous advantages in folding helicopter rotor blades. The invention employs a single actuator for folding a blade into fold position after accomplishing conditioning functions. That is, this blade folding mechanism automatically locks the pitch of the blade, sets the blade to the desired lead or lag angle, and folds the blade into the desired fold position in response to a single actuator. When it is desired to unfold the blade into flight position, the same actuator is employed to first rotate and lock the blade into flight position; the actuator then disengages the blade pitch lock and the lead or lag lock.

In contradistinction to power blade folding mechanisms of the past, the mechanism of this invention sets a determinate lead or lag position for folding and is relatively simple and uncomplicated. Additionally, the use of a single actuator for accomplishing all the functions needed for both folding and unfolding rotor blades offers a mechanism, which is capable of achieving its purposes quickly to alleviate the problem of time consuming manual folding.

It should be understood that the articulation provided by the flap hinge and the lead-lag hinge, as set forth above, may be accomplished by other devices. In accordance therewith, the power blade folding mechanism of this invention is capable of utilization for folding rotor blades associated with such other devices.

For purposes of exemplification, a particular embodiment of the invention has been shown and described according to the present understanding thereof. However, it will be apparent that changes and modifications in the arrangement and construction of the parts thereof may be resorted to without departing from the spirit and scope of the invention.

I claim:

1. A mechanism for folding and unfolding rotor blade means of a rotary wing aircraft about hinge pins in the rotor system comprising actuating means having torque outputs in opposite directions, control means operatively connected to said actuating means to cause a first of said torque outputs to be operative and a second of said torque outputs to be inoperative during unfolded condition of said rotor blade means, lock means in said mechanism responsive to said actuating means, said actuating means moving said lock means to its locking position through said first torque output, and means responsive to the first of the torque outputs of said actuating means for advancing said rotor blade means about a lead-lag axis in the rotor system to a folding position after said lock means is in locking position, said control means being responsive to said actuating means to cause said first torque output to become inoperative and said second torque output to become operative when the means responsive to the first of the torque outputs of said actuating means has advanced a rotor blade to its folding position whereby said actuating means can move the rotor blade means to its folded position.

2. A mechanism for folding and unfolding a member about a hinge comprising first lock means, control means, power means operatively connected to said member and having first drive means adapted to rotate said member into and out of a fold position, said power means having second drive means adapted to actuate said first lock means and said control means, said first lock means being in operative relation with said member and adapted to condition said member prior to folding said member into the fold position, said control means being responsive to said power means to cause said first drive means to be operative and said second drive means to be inoperative when said member is unfolded and for locking said second drive means from driving when said member is folding and unfolding, said control means being adapted to unlock said member and said first drive means as said control means locks said second drive means whereby said drive means drives said first member into the fold position about a hinge after said first lock means conditions said member for folding.

3. A rotary wing aircraft having a fold pin about which rotor blades may be folded and a lead-lag hinge, mechanism for folding and unfolding rotor blade means comprising pitch lock means, blade clamp assembly means, actuating means having first output means and second output means for exerting forces in opposite directions, said pitch lock means being responsive to said first output means for locking said rotor blade means to prevent change of pitch and for permitting said first output means to advance said rotor blade means about the lead-lag hinge to a folding position, means responsive to said first output means for locking said first output means as said rotor blade means approaches the folding position, said blade clamp assembly means being responsive to said actuating means to allow said first output means to be operative and to cause said second output means to be inoperative during unfolded condition of said rotor blade means, said blade clamp assembly means being responsive to said actuating means to cause said second output means to become operative as said rotor blade means approaches the folding position whereby said actuating means moves said rotor blade means into its folded position about the fold pin.

4. In a rotary wing aircraft, mechanism as claimed in claim 3 wherein said pitch lock means comprises pin lock means responsive to said first output means, and pin stop means fixedly mounted for contact with said pin lock means, said pin lock means abutting said pin stop means during response to said first output means whereby said first output means advances said blade rotor means to the folding position.

5. In a rotary wing aircraft, mechanism as claimed in claim 4 wherein said blade clamp assembly means comprises cam means having a first cam portion and a second cam portion extending at an angle from said first cam portion, a rotatable clamp for locking said rotor blade means and said second output means during unfolded condition of said rotor blade means, roller means connecting said cam means and said rotatable clamp for locking said first output means during folding and unfolding of said rotor blade means and for unlocking said rotor blade means and said first output means as said second output means is locked, a projection on said rotor blade means, an unfold stop fixedly positioned for abutment with said projection, said projection abutting said unfold stop during unfolded condition of said rotor blade means, tooth means on said projection, clamp arm means on said rotatable clamp for contact with said projection to clamp said projection against said unfold stop, and a clamp gear portion on said rotatable clamp for engagement with said tooth means whereby said blade clamp assembly means controls said first output and said second output means in folding, unfolding, and clamping of said rotor blade means.

6. In a rotary wing aircraft, a plurality of rotor hubs, each of said hubs having rotor blade means including a fold pin and lead-lag axis mounted thereon, blade folding and unfolding mechanism associated with at least one of said rotor blade means for pivotally folding and unfolding said rotor blade means about the fold pin, said blade folding and unfolding mechanism comprising pitch lock means; blade clamp assembly means; power means having first drive means adapted to drive said blade means; said power means having second drive means adapted to drive said pitch lock means; said pitch lock means having pin lock means to prevent change of pitch of said blade means; pin stop means fixedly mounted for abutment with said pin lock means to impart pivotal movement about said lead-lag axis to said rotor blade means into selective folding position; and means responsive to said second drive means to lock said second drive means as said blade means approaches the selective position; said blade clamp assembly means including cam means responsive to said second drive means, said cam means having a first portion and a second portion extending at an angle from said first portion, an unfold stop fixedly mounted for abutment with a blade means projection, said blade means projection contacting said unfold stop when said rotor blade means is unfolded, tooth means projecting from said projection, and a rotatable clamp having roller means for connecting said rotatable clamp to said cam means, said rotatable clamp having clamp arm means for urging said projection against said unfold stop during unfolded condition of said blade means, said rotatable clamp having a clamp gear portion for engagement with said tooth means whereby said first drive means pivotally drives said rotor blade means about said folding pin into folded position after said second drive means conditions said rotor blade means for folding.

7. In a rotary wing aircraft as claimed in claim 6 wherein said blade clamp assembly means further comprises plate means connected to said blade means projection and having a flange, said tooth means having a protuberance juxtaposed to said flange, and lever means connected to said rotatable clamp and having a lateral protuberance and a slide surface whereby said lever slidably contacts said tooth protuberance and said flange during pivotal rotation of said rotor blade means into its folded position.

8. In a rotary wing aircraft as claimed in claim 7 wherein each rotor hub has a plurality of rotor blade means mounted thereon and each rotor blade means of said plurality of rotor hubs has associated therewith a blade folding mechanism for folding said rotor blade means over the fuselage of the aircraft.

9. In a rotary wing aircraft as claimed in claim 8 wherein the blade folding and unfolding mechanism of at least one of said blade means is inclined with respect to a vertical plane extending along the longitudinal axis of said blade means for folding said blade means into predetermined vertically spaced relationship with respect to other parts of said aircraft.

10. A mechanism for folding and unfolding the rotor blade about a hinge pin in the rotor system of a rotary wing aircraft comprising actuating means having a plurality of outputs, control means operatively connected to said actuating means to cause the first of said outputs to be operative and the second of said outputs to be inoperative during unfolded condition of said rotor blade, lock and positioning means in said mechanism, said first output during its operative stage operating said lock and positioning means to prepare the rotor system for blade folding and for flight, a second output of said plurality of outputs for causing a rotor blade in a rotor blade system to fold and unfold about the hinge pin, said control means being responsive to said actuating means to cause said first output to become inoperative and said second output to become operative as the rotor blade commences to fold about the hinge pin in the rotor system whereby said actuating means can drive the rotor blade to its folded position.

11. A mechanism for folding and unfolding a rotor blade about a fold pin in the rotor blade means of a rotary wing aircraft comprising actuating means having a plurality of torque outputs, control means in operative connection with said actuating means to cause a first of said torque outputs to be operative and a second of said torque outputs to be inoperative during the portions of the folding cycle when the blade means is being prepared for folding or for flight, means in said mechanism responsive to the first of the torque outputs of said actuating means for advancing said rotor blade means about the lead-lag axis in the rotor blade means to a folding position, said control means being responsive to said actuating means to cause said first torque output to become inoperative and said second torque output to become operative as said rotor blade means enters the folding or unfolding phases whereby said second torque output of said actuating means can move said rotor blade means to its folded and unfolded positions.

12. In a rotary wing aircraft having a lead-lag hinge and a hinge pin about which the rotor blade means may be moved to a folded and unfolded position, a blade folding mechanism comprising actuating means having a plurality of outputs, control means operatively connected to said actuating means to cause a first of said outputs to be operative and a second of said outputs to be inoperative, lock means in said mechanism and operatively connected to said first output to lock the pitch control of the blade, means responsive to said actuating means to position said rotor blade means about said lead-lag axis for the folding operation, said control means being responsive to said actuating means to cause said first output to become inoperative and said second output to become operative as the rotor blade means commences to fold about the hinge pin whereby said actuating means moves said rotor blade means to its folded position.

References Cited in the file of this patent

UNITED STATES PATENTS

| 2,623,597 | Miller et al. | Dec. 30, 1952 |
| 2,623,711 | Pullin et al. | Dec. 30, 1952 |
| 2,925,130 | Buivid | Feb. 16, 1960 |
| 2,950,767 | Lemont | Aug. 30, 1960 |
| 3,097,701 | Buivid | July 16, 1963 |

FOREIGN PATENTS

| 852,841 | Great Britain | Nov. 2, 1960 |